UNITED STATES PATENT OFFICE.

FRANK C. MATTERN, OF GREAT NECK, NEW YORK, ASSIGNOR TO FAIRBANKS COMPANY, A CORPORATION OF NEW YORK.

COTTON-SEED-WEIGHING APPARATUS.

1,328,747.  Specification of Letters Patent.  Patented Jan. 20, 1920.

Application filed April 26, 1917. Serial No. 164,611.

*To all whom it may concern:*

Be it known that I, FRANK C. MATTERN, a citizen of the United States of America, and a resident of Great Neck, in the county of Nassau and State of New York, have invented new and useful Improvements in Cotton-Seed-Weighing Apparatus, of which the following is a specification.

The objects of this invention are to provide improved means particularly adapted for receiving cotton seed at the gin and determining the weight of the seed; to provide means for relieving the scales of the seed quickly and at any desired time; to provide an improved automatic closure for the bottom of the weighing hopper which will lock against the pressure of the cotton seed to open it, but which is readily opened by the operator when it is desired to discharge the cotton seed; to prevent the cotton seed from choking or clogging in the receiving hopper; to provide a simple weighing device which is easily and readily understood and operated; to economize floor space and permit arranging the parts to suit varying conditions, and to obtain other advantages and results as may be brought out in the following description.

Referring to the accompanying drawings, in which like numerals of reference indicate the same parts throughout the several views, Figure 1 is a view in elevation of a cotton seed weighing apparatus embodying my invention, one of the supporting beams being broken away in part;

Fig. 2 is a view looking in the same direction as Fig. 1, showing the apparatus in central section, without the scale;

Fig. 3 is a similar sectional view, on larger scale, of a portion of the apparatus showing a certain gate in closed position;

Fig. 4 is a sectional view similar to Fig. 3 showing the gate open;

Fig. 5 is an elevation looking at the left hand side of the apparatus as viewed in Fig. 1;

Fig. 6 is a view looking at the upper part of the hopper from the right hand side of Fig. 1 but upon larger scale;

Fig. 7 is a plan of a portion of the hopper supporting means shown in Fig. 6, and Fig. 8 is a vertical section of the lower portion of the receiving hopper similar to Fig. 2, but upon larger scale.

In the specific embodiment of the invention illustrated in said drawings, the reference numerals 1, 2 indicate weighing and receiving hoppers respectively, the former being suspended by suitable connections so as to be balanced by a scale 3 of any desired construction, and the latter being supported in fixed position beneath the weighing hopper. Cotton seed is fed into the upper or weighing hopper 1 and its weight ascertained by the scale 3, after which said seed is permitted to dump quickly into the receiving hopper 2, from whence it can be disposed of at leisure the weighing hopper in the meantime being free to receive more seed to be weighed. Obviously the upper or weighing hopper must discharge the seed quickly, so no interruption be caused in the operation of the plant supplying the seed to the weighing hopper.

It is preferable, in most instances at least, to suspend the hoppers from above so as to avoid taking up a great deal of floor space, and while in the drawings I have shown a system of supporting beams, I do not wish to be understood as restricting myself thereto, in that most installations will utilize the existing beams and rafters which form part of the ceiling of the mill. For illustrative purposes, longitudinal beams 4, 4 are provided spaced sufficiently to receive the weighing hopper between them, and carried transversely across these longitudinal beams are rafters 5, 5, 5, between two of which, also, the weighing hopper may move.

Rocker shafts 6, 6 are mounted horizontally at and preferably parallel to two opposite sides of the weighing hopper near its top, the support for them being shown as hooked bolts 7, 7 depending from the rafters 5, 5. The hooks of said bolts 7, 7 each carry a yoke 8 providing spaced and parallel arms apertured in alinement adjacent their lower free ends for receiving the ends of a supporting knife 9 which ends project from opposite sides of a web 10 formed integrally with a sleeve 11 fast upon the said rocker shaft. It is to be noted that as shown in the drawings, the webs 10 project toward the weighing hopper, and further toward the end of the webs than said knives 9 are other similar knives 12 also projecting laterally from the webs. These knives support ally from the webs. These knives support yokes 13 each of which pass through the eye of an eye-bolt 14 in turn supporting horizontally disposed strips 15 fast upon two opposite sides of the weighing hopper.

UNITED STATES PATENT OFFICE.

JOHN FRANCIS MAURER, OF WEST NEW YORK, NEW JERSEY.

CRATE FOR BOTTLES.

1,328,748.  Specification of Letters Patent.  Patented Jan. 20, 1920.

Application filed March 29, 1919. Serial No. 285,997.

*To all whom it may concern:*

Be it known that I, JOHN F. MAURER, a citizen of the United States, and a resident of West New York, in the county of Hudson and State of New Jersey, have invented a new and Improved Crate for Bottles, of which the following is a full, clear, and exact description.

The invention relates to crates or boxes for holding bottles containing milk, beer and the like, and its object is to provide a new and improved crate or box for holding such bottles and arranged to render the crate or box exceedingly strong, durable and cheap to manufacture. Another object is to securely hold the bottles in place and properly spaced apart to prevent breakage of the bottles while handling the crate filled with the bottles. Another object is to securely fasten the bottle spacing means in position within the casing body and without the use of nails or similar fastening devices. Another object is to permit of readily making repairs on the spacing device without requiring taking the crate apart.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the improved crate for holding bottles;

Fig. 2 is a longitudinal section of the same on the line 2—2 of Fig. 1; and

Fig. 3 is a cross section of the same on the line 3—3 of Fig. 1.

The body or casing of the crate is open at the top and is formed of the sides 10 and 11 and the ends 12 and 13 fastened together in the usual manner of box construction. The bottom of the casing or body is formed by a number of slats 16 spaced equal distances apart and similarly spaced from the sides 10 and 11, and narrow slats 17 and 18 are arranged lengthwise on the inner faces of the lower portions of the sides 10 and 11. The slats 16, 17 and 18 are halved into notches formed in the lower edges of the ends 12 and 13 and the said slats are securely bound in place by metallic end straps 19 and 20 fastened exteriorly to the bottom, sides and top edges of the ends 12 and 13 by the use of nails or other fastening devices. The body or casing of the crate so far described is of usual construction.

Within the body or casing is arranged a spacing means to provide individual pockets, one for each bottle to be placed into the crate. As shown in Fig. 1, the crate is provided with twenty such pockets for holding a corresponding number of milk bottles but it is evident that I do not limit myself to this particular number of pockets as crates with more or less pockets may be constructed without deviating from my invention. The spacing means above referred to is as follows: The inner faces of the ends 12 and 13 are provided in their lower portions with vertically disposed grooves 25 and 26 extending from the longitudinal median line of the bottom slats 16. The grooves 25 and 26 are adapted to be engaged by the ends of partitions 27 sprung in place and seated at their lower ends along the middle of the slats 16. In practice the partitions 27 are inserted through the open top of the box and are bent to permit of springing the ends of the partitions into engagement with the grooves 25 and 26. Rods 30 extend transversely through the partitions 27 and through the sides 10 and 11 and each rod is provided at one end with a head adapted to abut against the outer face of the corresponding side 10 or 11 while the other end is adapted to be formed into a roughened head to hold each rod securely in position. On the top of each partition 27 are seated spacing heads or knobs 35 located directly above the rods 30 and each head 35 is provided at the under side with a slot 36 fitting onto the upper portion of the corresponding partition 27. Rods 37, similar to the rods 30, extend transversely through the heads 35 above the partitions 27, and the ends of the rods 37 extend through the sides 10 and 11 and are held in place the same as the rods 30. By the arrangement described, the heads 35 are held in spaced relation on the top of the partitions 27 and the said heads are preferably cylindrical in shape and rounded off on the top and bottom to permit of readily placing the bottles in position in the individual pockets. It is understood that by the arrangement described individual pockets are provided, alike in size, one for each